United States Patent [19]

Anderson et al.

[11] Patent Number: 5,021,776

[45] Date of Patent: Jun. 4, 1991

[54] ELECTRONIC COMBINATION OF LOCK WITH CHANGEABLE ENTRY CODES, LOCK-OUT AND PROGRAMMING CODE

[75] Inventors: Charles E. Anderson, Mint Hill; William C. Miller, Monroe, both of N.C.

[73] Assignee: Yale Security Inc., Monroe, N.C.

[21] Appl. No.: 393,073

[22] Filed: Aug. 9, 1989

Related U.S. Application Data

[63] Continuation of Ser. No. 217,028, Jul. 11, 1988, abandoned.

[51] Int. Cl.[5] .......... G06F 7/00

[52] U.S. Cl. .......... 340/825.31; 340/825.34; 340/542; 235/382.5; 235/382

[58] Field of Search .......... 349/825.31, 825.34, 349/825.69, 825.72, 825.5, 825.56, 540, 542; 70/277, 278; 235/382, 380, 382.5; 361/172; 365/229; 364/464

[56] References Cited

U.S. PATENT DOCUMENTS

| | | | |
|---|---|---|---|
| 3,596,250 | 7/1971 | Sedley . | |
| 3,751,718 | 8/1973 | Hanchett, Jr. | 70/278 |
| 3,829,834 | 8/1974 | Frankland et al. | 340/543 |
| 3,857,018 | 12/1974 | Stark et al. | 235/382 |
| 3,881,171 | 4/1975 | Moorman et al. | 340/825.31 |
| 4,083,424 | 4/1978 | von den Stenmen et al. | 70/278 |
| 4,177,657 | 12/1979 | Aydin | 70/277 |
| 4,532,507 | 7/1985 | Edson et al. | 340/825.35 |
| 4,646,080 | 2/1987 | Genest et al. | 340/825.31 |
| 4,684,945 | 8/1987 | Sanderford, Jr. | 70/278 |
| 4,750,040 | 6/1988 | Hakamada | 365/229 |
| 4,774,512 | 9/1988 | Jolidon et al. | 340/825.56 |
| 4,809,199 | 2/1989 | Burgess et al. | 340/825.31 |
| 4,868,832 | 9/1989 | Marrington et al. | 365/229 |

FOREIGN PATENT DOCUMENTS

| | | | |
|---|---|---|---|
| 0127220 | 8/1982 | Japan | 365/229 |
| 0163298 | 8/1985 | Japan | 365/229 |
| 0262229 | 12/1985 | Japan | 365/229 |
| 0005326 | 1/1986 | Japan | 365/229 |
| 8601360 | 2/1986 | World Int. Prop. O. | 361/172 |

OTHER PUBLICATIONS

"Combination Lock," *Hobby Electronics*, vol. 3, No. 12, Oct. 1981, pp. 21-23.

*Primary Examiner*—Donald J. Yusko
*Assistant Examiner*—Peter S. Weissman
*Attorney, Agent, or Firm*—Sughrue, Mion, Zinn, Macpeak & Seas

[57] ABSTRACT

A keyless electronic combination lock is adaptable for placement on a door, and operates independently of any other locks and without a central control system. The lock has a keypad for entering combinations, a random access memory (RAM) into which the entered data is loaded, a microprocessor, and an electrically erasable programmable read only memory (EEPROM). One or more entry codes for opening the lock are stored in the EEPROM and loaded into the RAM when the lock is powered-up. To open the lock, one of these codes or a master entry code must be entered at the keypad. Each entry code can be individually prevented from opening the lock by entering a corresponding individual lock-out code. All of the entry codes can be locked-out by entering a master lock-out code, by entering all of the individual lock-out codes or by throwing a dead bolt. The master entry code works regardless of the lock-out status and regardless of the dead bolt. To change lock-out status, the lock-out code is simply reentered. All of the codes can be changed as desired by entering a programming code, followed by an identifying code to tell the microprocessor which code to change. The programming code can be installed in the lock at the time of manufacturing the lock, and it can be changed during use in the field.

4 Claims, 4 Drawing Sheets

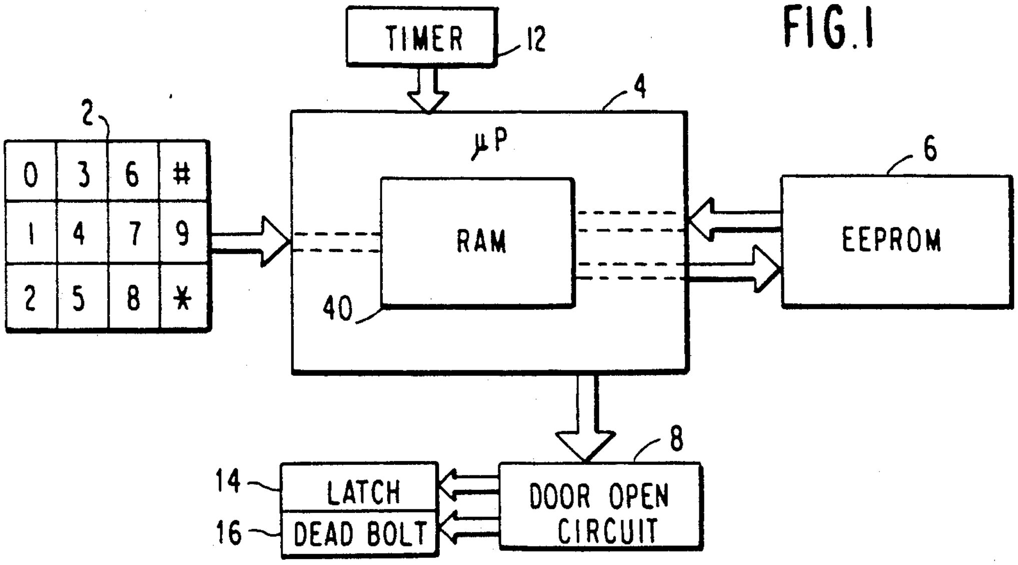

FIG. 1

FIG. 2A

| COMBINATION | RESULT |
|---|---|
| EC1 | OPENS LOCK, UNLESS LOCKED OUT |
| EC2 | OPENS LOCK, UNLESS LOCKED OUT |
| EC3 | OPENS LOCK, UNLESS LOCKED OUT |
| MEC | OPENS LOCK, REGARDLESS OF LOCK-OUT STATUS |
| LO1 | ALTERNATE ENTRY TURNS ON OR OFF LOCK-OUT OF EC1 |
| LO2 | ALTERNATE ENTRY TURNS ON OR OFF LOCK-OUT OF EC2 |
| LO3 | ALTERNATE ENTRY TURNS ON OR OFF LOCK-OUT OF EC3 |
| MLOC | ALTERNATE ENTRY TURNS ON OR OFF MASTER LOCK-OUT |
| *PC | MICROPROCESSOR ENTERS PROGRAMMING MODE FOR TIME T2 |

FIG. 2B

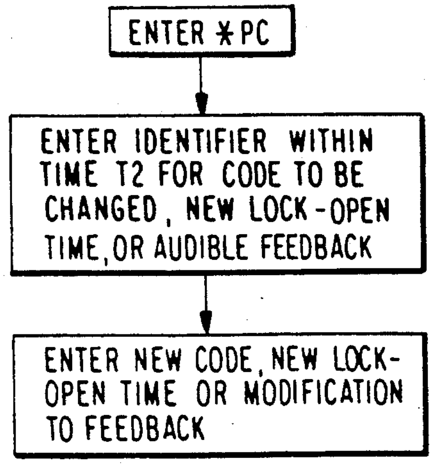

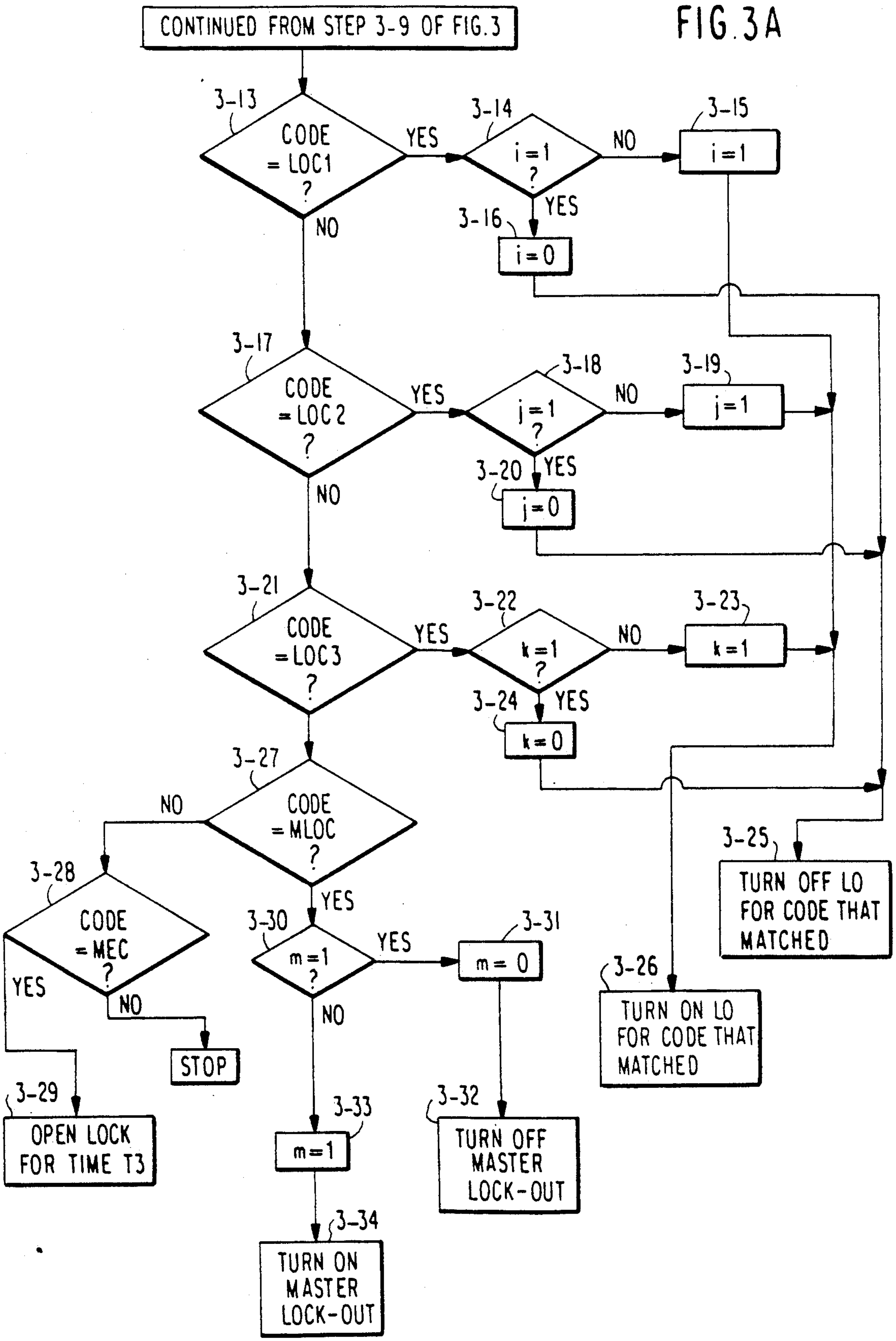
FIG.3A
CONTINUED FROM STEP 3-9 OF FIG.3
3-13
CODE = LOC1 ?
YES
NO
3-14
i=1 ?
NO
YES
3-15
i=1
3-16
i=0
3-17
CODE = LOC2 ?
YES
NO
3-18
j=1 ?
NO
YES
3-19
j=1
3-20
j=0
3-21
CODE = LOC3 ?
YES
3-22
k=1 ?
NO
YES
3-23
k=1
3-24
k=0
3-27
CODE = MLOC ?
NO
YES
3-28
CODE = MEC ?
YES
NO
STOP
3-29
OPEN LOCK FOR TIME T3
3-30
m=1 ?
YES
NO
3-31
m= 0
3-32
TURN OFF MASTER LOCK-OUT
3-33
m=1
3-34
TURN ON MASTER LOCK-OUT
3-25
TURN OFF LO FOR CODE THAT MATCHED
3-26
TURN ON LO FOR CODE THAT MATCHED

ELECTRONIC COMBINATION OF LOCK WITH CHANGEABLE ENTRY CODES, LOCK-OUT AND PROGRAMMING CODE

This is a continuation of application Ser. No. 07/217,028, filed Jul. 11, 1988, now abandoned.

BACKGROUND OF THE INVENTION

The present invention relates to an electronic combination lock suitable for industrial, commercial or residential use and capable of operating independently of a central control system. More particularly, the present invention relates to an electronic combination lock with entry codes, lock-out codes and a programming access code (programming code) for entering a programming mode in which the entry codes and lock-out codes can be changed.

An electronic combination lock is desirable because the lock can be opened without a key. The problem of losing keys is eliminated, and the cost of producing keys is also eliminated. A basic electronic combination lock is disclosed in "Combination Lock," *Hobby Electronics*, vol. 3, no. 12, October 1981, pp. 21–23. To open the lock, a five digit combination is entered using numbered push buttons. If the buttons have been pressed in the correct order, and in fairly rapid succession, and if the entered code matches a predetermined code, the lock will open. However, this article does not disclose a way to change the code.

U.S. Pat. No. 4,532,507 (to Edson et al) discloses an electronic combination security system (such as an alarm) in which the codes for turning off the alarm can be changed. There is a keypad at which a temporary pass code or a permanent pass code can be entered to turn off the alarm. In addition, entry of the permanent pass code will allow the temporary pass codes to be changed by using function keys separate from the keypad. The function keys must be pressed within 45 seconds of entry of the permanent pass code. However, in the system of the Edson et al patent, the permanent pass code cannot be changed. Therefore, an unauthorized person who discovers the permanent pass code can always gain entry, no matter how often the temporary codes are changed. Moreover, if it is desired to prevent temporary codes from working for a period of time, e.g. during a temporary period of increased security, the codes must be deleted from the system and later re-entered into the system.

SUMMARY OF THE INVENTION

An object of the invention is to overcome the difficulties and limitations of the prior combination locks discussed above, and to create a simple to use, inexpensive electronic combination lock.

Another object of the invention is to provide an electronic combination lock in which combination codes for opening the lock can be easily changed by entry of a programming code, and the programming code can also be changed, to provide maximum security and convenience.

An additional object of the invention is to provide an electronic combination lock in which codes for opening the lock can be temporarily locked-out by merely entering a single combination code.

The above objects of the invention as well as additional objects are accomplished by an electronic combination lock in which each lock has a keypad for entering combinations, a random access memory (RAM) into which the entered data is loaded, a microprocessor, and an electrically erasable programmable read only memory (EEPROM). In the preferred embodiment, each lock is independent of all other locks in the system, and there is no central control system.

One or more entry codes for opening the lock are stored in the EEPROM and loaded into the RAM when the lock is powered-up. To open the lock, one of these codes or a master entry code is entered at the keypad. Each entry code can be individually prevented from operating by entering an individual lock-out code associated with the individual entry code. All of the entry codes can be locked-out by entering a master lock-out code or by entering all of the individual lock-out codes. The master entry code works regardless of the lock-out. To remove the lock-out, the lock-out code is simply re-entered.

The entry codes, lock-out codes, master lock-out code and master entry code can be changed as desired in a programming mode. Entry of a programming code causes the microprocessor to enter the programming mode. Then, a particular sequence of digits can be entered to identify which code is to be changed, and the new code can then be entered. The programming code can be installed in the lock at the time of manufacturing the lock, and it can be changed during use in the field.

To provide additional security, each digit in a particular code must be entered within a predetermined time of entering the preceding digit. Further, in programming mode, the amount of time for which the lock will remain unlocked after being opened is adjustable.

BRIEF DESCRIPTION OF THE DRAWINGS

The above objects, features and advantages as well as further objects, features and advantages of the invention will be better understood and readily apparent from the detailed description set forth below when read in conjunction with the accompanying drawings, in which:

FIG. 1 is a block diagram of a lock according to the present invention;

FIG. 2A is a chart showing various combination codes and their effects on the operation of the inventive lock during normal operating mode;

FIG. 2B is an explanatory diagram of the operation of the inventive lock during programming mode;

FIGS. 3 and 3A are flow charts of the operation of the microprocessor in the lock in the normal operating mode;

DETAILED DESCRIPTION OF THE PREFERRED EMBODIMENTS

Figure 3:
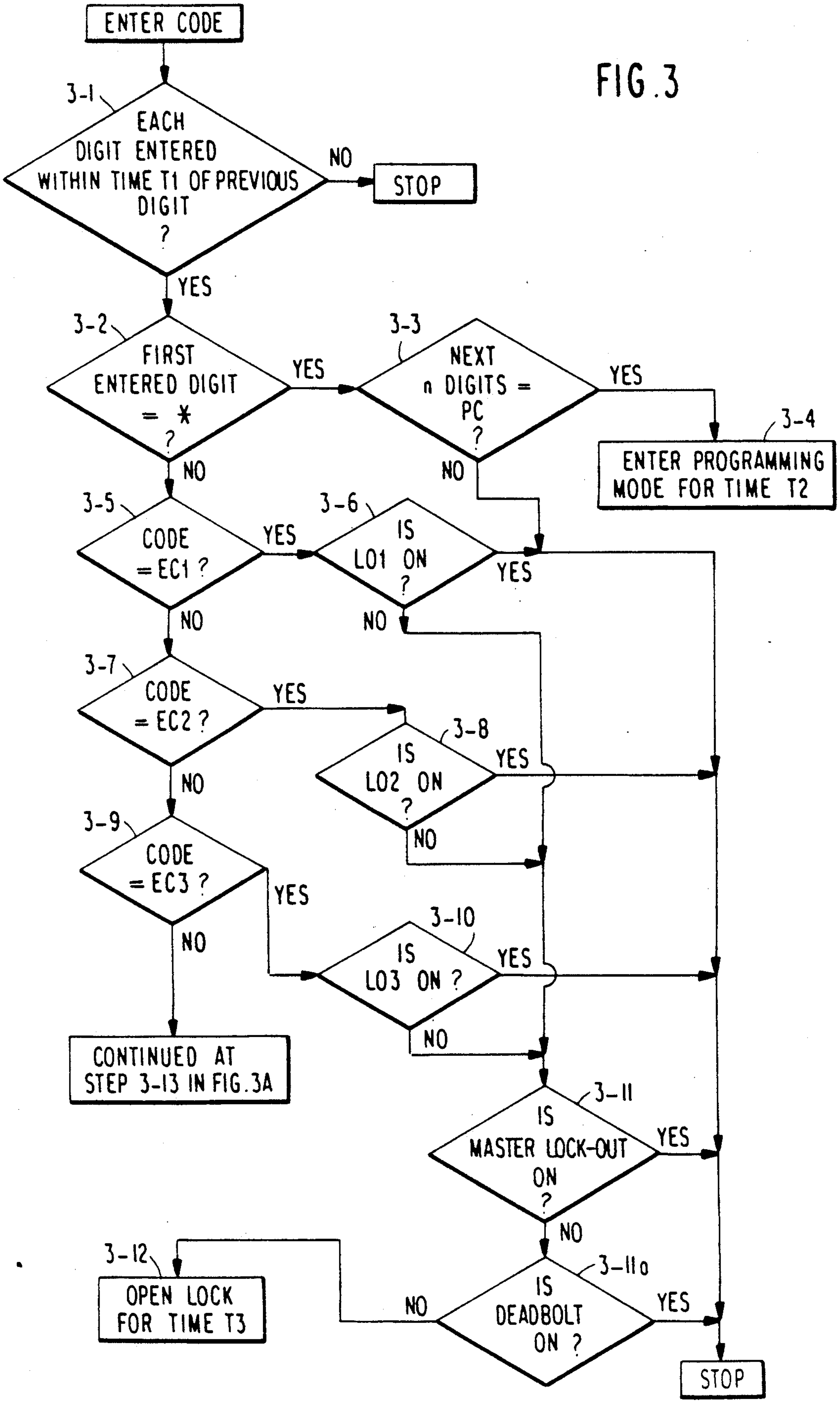

The electronic combination lock according to the invention is suitable for use in industrial, commercial or residential environments. A lock according to the invention is shown in FIG. 1. The lock can be placed on a door to a secured area of a plant, office or house. In the preferred embodiment, the lock is independent of any other locks used in the plant, office or house and there is no central control system.

With reference to FIG. 1, each lock has a keypad 2, a microprocessor (μP) 4, a RAM 40 and an EEPROM 6. The keypad 2 has a plurality of keys each having a unique character thereon. The terms "character" and "digit" will be used herein to refer to symbols as well as numerical digits. In FIG. 1, the RAM 40 is shown as part of the microprocessor, but the RAM can also be separate therefrom. Each lock also contains a door open circuit 8 and a timer 12. As is well-known in the art, the lock can be powered by a battery pack, not shown in FIG. 1 for the sake of clarity. This battery pack can be rechargeable. For example, the lock can be modified by connecting a trickle charge circuit to the microprocessor and battery pack. The battery pack can be connected, via contacts on the lock and corresponding contacts on the door frame, to an AC powered battery charger. The lock is also provided with a latch 14.

The operation of the lock will now be explained with reference to FIGS. 2A and 2B. Codes for controlling the operation of the lock and the effect of each code during a regular operating mode of the lock are shown in FIG. 2A. The EEPROM 6 and/or RAM 40 store a set of codes (individual entry codes: EC1, EC2 and EC3) for opening the lock. In this embodiment, there are three entry codes, but the number can vary as desired by the designer of the lock. In addition, there is a master entry code (MEC) for opening the lock, and there are three lock-out codes LO1, LO2, and LO3 for individually locking-out the entry codes EC1, EC2 and EC3, respectively. The lock-out codes work like toggle switches. That is, a first entry of one of the lock-out codes, e.g.. LO1, will prevent the corresponding individual entry code, EC1, from opening the lock. A second entry of the lock-out code will remove the lock-out status. To lock-out all of the entry codes, except the master entry code, a master lock-out code (MLOC) can be entered. The master lock-out code also works like a toggle switch.

In accordance with another feature of the system, security can be further improved by requiring that each digit of a code be entered within a predetermined time $T_1$ of the previous digit.

As noted above, when the programming code (PC) is entered while the microprocessor is in regular operating mode, the microprocessor will enter programming mode (FIG. 2B). The time which the microprocessor remains in programming mode can be limited to a predetermined time $T_2$ as an additional measure of security.

As shown in FIG. 2B, when the microprocessor 4 is in programming mode, the entry codes, master entry code, lock-out codes and master lock-out code can be changed. In addition, a "lock-open" time, i.e. a time period $T_3$ for which the microprocessor signals the door open circuit 8 to maintain the latch in an open position when the lock is opened, can also be changed. To change a code or the lock-open time, an identifier, such as a digit or sequence of digits, must be entered at the keypad to tell the microprocessor 4 which code the next set of digits will replace or that the next digits correspond to the new lock-open time. Then, the new code or new lock-open time can be entered, and the new code will replace whatever the old code was, or the new lock-open time will replace whatever the old lock-open time was. The identifier can thus correspond to an address in the EEPROM and/or RAM at which the next sequence of digits will be written over the current contents stored there. Where the sequence of digits is a new lock-open time, either the sequence can be the actual lock-open time, e.g. in seconds, or a further code corresponding to a particular lock-open time stored in the RAM and/or EEPROM.

In accordance with another feature of the invention, the lock can be include a dead bolt 16 (FIG. 1 and FIG. 3) for preventing the entry codes, except the master entry code, from opening the lock, The dead bolt can be engaged or released mechanically, such as by use of a thumbscrew, from inside the locked area, It is noted that the programming code PC in FIGS. 2A and 2B is shown with an asterisk in front of it in accordance with a further feature of the invention. The asterisk (or any symbol) can be entered prior to the programming code to tell the microprocessor that the next sequence of digits is to be compared with only the programming code. If the symbol is not entered, the entered code is not compared with the programming code. This minimizes the number of comparisons. It also provides additional security for the system, to prevent unauthorized personnel from accidentally entering the programming code instead of one of the other codes. The symbol in front of the programming code can thus correspond to an address at which the programming code is stored. The symbol can also be used to tell the microprocessor that the identifier following the programming code will apply to one of changing the codes or changing the lock-open time.

If desired, the lock can be adapted to issue feedback, such as audible tones, to the user to confirm entry of a digit, lock-out status, etc. The lock can also be equipped to cancel the audible feedback or modify it, by means similar to changing the lock-open time (see FIG. 2B).

Figures 4, 5:
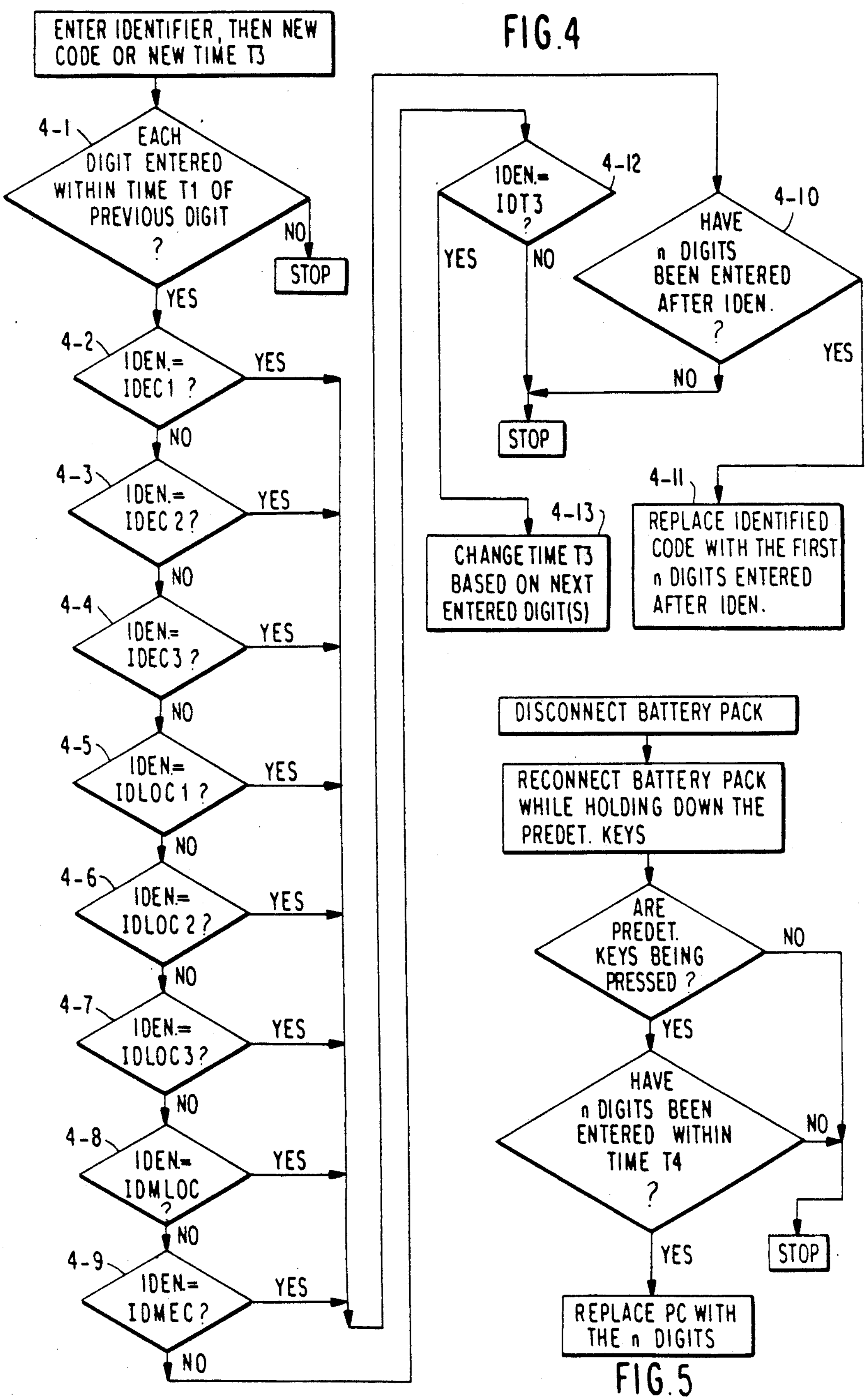
FIG. 4 is a flow chart of the operation of the microprocessor when in programming mode.
FIG. 5 is a flow chart of operation of the microprocessor during power-up of the lock.

FIGS, 3 and 3A are flow charts of a suitable scheme of operation of the microprocessor 4 in regular operating mode, and FIG. 4 is a flow chart of a suitable scheme of operation of the microprocessor in the programming mode for carrying out the above-described functions of the lock. Whether the microprocessor is in regular operating mode or programming mode, its operations will include comparisons of the entered digits with those stored in the lock. (In FIGS. 3, 3A and 4, the entered digits are "code", "iden," or "digits", and the stored codes are referred to using the codes shown in FIG. 2A. In addition, the stored identifiers are referred to with "ID" followed by the corresponding code of FIG. 2A.) Any scheme for comparison of the entered code with codes stored in the lock can be used.

When a code, i.e., a series of digits, is entered at the lock, the microprocessor uses the timer 12 to determine whether each digit has been entered within the time $T_1$ of the previously entered digit (Step 3-1). If this requirement has not been satisfied, the microprocessor stops. If the digits have been entered within the time $T_1$, the microprocessor determines whether the first entered digit corresponds to a stored digit "*" which tells the lock that the next series of digits must be compared only with the programming code. If the first entered digit corresponds to "*", the microprocessor compares the next n digits with the stored programming code (steps 3-2 and 3-3). If this comparison is favorable, the microprocessor enters programming mode for time $T_2$ (step 3-4). If the comparison is unfavorable, the microprocessor stops.

If, at step 3-2, the first entered digit does not equal "*", the microprocessor knows that the first n digits correspond to a code to be compared sequentially with the entry codes, lock-out codes, master lock-out code and master entry code. That is, at steps 3-5, 3-7 and 3-9 the microprocessor compares the entered code with EC1, EC2 and EC3. If the entered code corresponds to one of the entry codes EC1, EC2 or EC3, then the microprocessor will ask whether or not the individual lock-out code for that entry code is on (steps 3-6, 3-8 and 3-10). If the associated lock-out code is on, the microprocessor stops. If the associated individual lock-out code is off, the microprocessor must then ask whether the master lock-out and/or dead bolt are on (steps 3-11 and 3-11*a*). If the master lock-out or dead bolt is on, the microprocessor stops. If neither are on, the microprocessor signals the door open circuit 8 to open the latch for time $T_3$.

If the entered code does not match any of the entry codes, at step 3-13 (FIG. 3A) the microprocessor asks whether the entered code equals LOC1. If equal, the microprocesser asks whether a variable "i" equals 1 (step 3-14) to determine the current lock-out status. In this embodiment, i has arbitrarily initially been defined as zero when the lock-out is off, If i does not equal 1, i is set to 1 (step 3-15) and lock-out (LO) of EC1 is turned on (step 3-26), If i equals 1 at step 3-14, then i is set to zero at step 3-16 and lock-out is turned off (step 3-25). If the entered code does not equal LOC1 at step 3-13, the microprocessor then asks whether the entered code equals LOC2 (step 3-17), and if unequal, whether the code equals LOC3 (step 3-21). As the sequence of steps which the microprocessor performs following step 3-17 when the entered code equals LOC2, and step 3-21 when the entered code equals LOC3, function the same as steps 3-14, 3-15, 3-16, 3-25 and 3-26, the detailed description of these steps will be omitted as being redundant.

If none of the entry codes or lock-out codes has been matched, the microprocessor compares the entered code with the master lock-out code (step 3-27). If there is a match, the microprocessor determines whether or not a variable "m" is equal to 1 (step 3-30). Similar to the case of the individual lock-out codes, if m equals 1, m is set to zero (step 3-31) and the master lock-out is turned off (step 3-32). If m is not equal to 1, m is set to 1 (step 3-33) and the master lock-out is turned on (step 3-34). If the master lock-out code has not been matched, the microprocessor determines whether the entered code matches the master entry code (step 3-28). If there is no match, the microprocessor stops. If there is a match, the microprocessor opens the lock for time $T_3$ (step 3-29).

With reference to FIG. 4, in which the microprocessor is in programming mode, first an identifier is entered and then the new code or time code (or modification to the feedback, not shown to simplify the drawing). The identifier is a preliminary code which tells the microprocessor which of the entry codes, master entry code, lock-out code or master lock-out code, or time code, to replace. The identifier can thus correspond to an address at which the code to be replaced is stored. In the preferred embodiment, the identifier is a fixed, unique number for each code. Therefore, the identifier IDEC1 for EC1, e.g., will not change even when EC1 is replaced, and IDEC1 will not equal any of the other identifiers, e.g. IDEC2.

At step 4-1, if desired, the microprocessor can determine whether each digit in the entered identifier and new code or new time $T_3$ has been entered within the time T[illegible] of the previous digit. If the answer is no, the microprocessor stops. If the answer is yes, the microprocessor will then sequentially compare the entered identifier (designated in FIG. 4 by "iden.") with the stored identifier identifying digits designated in FIG. 4 by "ID" followed by the designation, e.g. EC, of the associated stored code) for each particular code until there is a match. That is, the entered identifier is compared with that for entry codes 1, 2 and 3 at steps 4-2, 4-3 and 4-4, respectively. If none of these have matched, the entered identifier is compared with that for lock-out codes 1, 2 and 3 at steps 4-5, 4-6 and 4-7, respectively. If there is still no match, the entered identifier is compared with that for the master lock-out code at step 4-8. If there is still no match. the entered identifier is compared with that for the master entry code at step 4-9. If the entered identifier matches one of the stored identifiers for codes, the microprocessor asks whether n digits have been entered after the identifier (step 4-10). This step is performed prior to replacing the identified code with the newly entered code to ensure that the identified code is replaced with a code having the same number of digits. Accordingly, if n digits have been entered after the identifier, the identified code is replaced with the first n digits entered after the identifier. If n digits have not been entered, the microprocessor stops. If the entered identifier does not match any of those for codes, it is compared with that for changing the lock-open time. If the comparison is favorable, the lock-open time $T_3$ is changed based on the next entered digit or digits (steps 4-12 and 4-13). If the entered identifier has not matched any of those for the codes or that for changing the time $T_3$, (or that for changing the feedback), the microprocessor stops.

It should be noted that whenever the microprocessor stops, it can simply revert to normal operating mode at an initial state (as if no digits have been entered). Further, prior to entering this initial state, but after stopping, the microprocessor can be set to experience a delay in order to slow down those who are attempting to gain unauthorized access to the secured area or the programming mode.

It should also be noted that the inventive lock can be formed as any type of lock mechanism, such as a mortise-type lock. Further, the programming code, or all of the codes, can initially be set at a factory where the lock is manufactured. The codes, except for the programming code, can then be entered or changed when the lock is in use as described above. Moreover, in accordance with a further feature of the invention, the programming code can itself be changed in the field by powering-down the lock and then re-powering it while performing a predetermined operation to ensure that only authorized personnel can change the programming code. With reference to FIG. 5, changing the programming code is performed by first disconnecting the battery pack, which can be connected to the microprocessor by means of a wiring harness. The battery pack is then reconnected while holding down a predetermined key or keys. The microprocessor, which almost instantaneously receives power upon reconnection of the battery pack, will ask whether the predetermined key or keys are being pressed, and if so, whether or not n digits have been entered within a predetermined time $T_4$. If the n digits have been entered within the time $T_4$, the microprocessor replaces the programming code with them. If the microprocessor does not detect that the predetermined keys are being pressed or that n digits have been entered within the time $T_4$, the microprocessor stops.

Not all of the features of the present invention need be used to form a lock according to the invention. For example, the lock can be formed without a dead bolt. In addition, instead of using both the EEPROM and the RAM, just one of these memories could be used. Other types of memories could also be used. However, EEPROM has the advantage that it can be written over, yet if the power source of the lock is shut-off, the data stored in the EEPROM will not be lost. Accordingly, in the disclosed embodiment of the lock, the codes stored in the EEPROM can automatically be loaded into the RAM when the lock is powered-up again.

Numerous other variations of the inventive lock system are also possible. For example, the order of comparison of codes in regular operating mode and in programming mode can be changed, even though some variations may increase the cost of the lock.

In the inventive lock, one or more combination codes for opening the lock can be provided, so that access to secured areas can be controlled. Additional control of secured areas is obtained by use of the lock-out codes. Particular entry codes can be selectively locked-out by simply entering the associated lock-out code, without having to reprogram the lock or change the entry codes. Re-enabling a locked-out entry code is performed by simply re-entering the lock-out code. If there is a need to lock-out all lock users, except for higher ranking users, the master lock-out code can simply be entered. The higher ranking users can still gain entry by using the master entry code. All of the lower level users can also be locked-out from inside the secured area by simply throwing the dead bolt. If there is a major breach in security for one or more of the entry codes or lock-out codes, the current codes can quickly be replaced by use of the programming code. For even greater security, the programming code can be changed in the field periodically and/or when it has been discovered by unauthorized personnel. The lock can provide further security by requiring each digit in a code to be entered within a predetermined time of the previous digit. Moreover, use of the lock is further simplified by providing audible feedback, and the ability to change the feedback as well as the ability to change the length of time for which the lock will remain unlatched when opened. Thus, an easy to use, inexpensive keyless lock is achieved.

We claim:

1. An electronic lock for keyless entry comprising:

(a) means for entering a code;

(b) means for storing a set of codes including at least one entry code, at least one lock-out code, and a programming code, wherein said lock-out code is unique with respect to said entry code; and (c) a control mechanism, connected to the means for entering and the means for storing, and including:

(1) first means, receiving the code from the means for entering and the at least one entry code from the means for storing, for opening the lock for a time period in response to entry of a code corresponding to said at least one entry code;

(2) second means, receiving the code from the means for entering and the at least one lock-out code from the means for storing, and responsive to entry of a code corresponding to said at least one lock-out code, for preventing said first means from opening the lock;

(3) third means, operating independently of any central system and receiving the code from the means for entering and the programming code from the means for storing, for changing the stored entry code to a new entry code in response to entry of two codes corresponding respectively to the programming code and the new entry code, and for changing the stored lock-out code to a new lock-out code in response to entry of three codes corresponding to the programming code, an identifier code, and the new lock-out code; and (4) fourth means, receiving the code from the means for entering and the programming code from the means for storing, for changing the time period to a new time period in response to entry of three codes corresponding to the programming code, another identifier code, and the new time period.

2. The electronic lock according to claim 1, further comprising a rechargeable power source.

3. An electronic lock for keyless entry comprising:

(a) means for entering a code;

(b) means for storing a set of codes including at least one entry code, at least one lock-out code and a programming code, wherein said lock-out code is unique with respect to said entry code; and (c) a control mechanism connected to the means for entering, and the means for storing, the control mechanism including:

(1) first means, receiving the code from the means for entering and the at least one entry code from the means for storing, for opening the lock for a predetermined lock-open time in response to entry of a code corresponding to said at least one entry code;

(2) second means, receiving the at least one lock-out code from the means for storing and the code from the means for entering, for preventing the first means from opening the lock in response to entry of only one code corresponding to said at least one lock-out code; and (3) third means, operating independently of any central system and receiving the programming code from the means for storing and the code from the means for entering, for changing the stored entry code to a new entry code in response to entry of two codes corresponding respectively to the programming code and said new entry code; wherein said means for storing stores the stored entry code and the stored lock-out code at first and second addresses, respectively;

said third means of said control mechanism is responsive to entry of three codes, including said two codes and a first identifier code corresponding to said first address, to change the stored entry code to said new entry code; and said control mechanism further includes fourth means for receiving a code from the means for entering and the programming code from the means for storing, said fourth means being responsive to entry of a code corresponding to the stored programming code, a second identifier code corresponding to said second address, and a new lock-out code, for changing the stored lock-out code to said new lock-out code, said fourth means further including means for changing the lock-open time to a new lock-open time in response to entry of a combination code corresponding to the programming code and the new lock-open time, 4. The electronic lock of claim 3 wherein said means for storing comprises a random access memory for storing said set of codes, and an electrically erasable programmable read only memory for storing a duplicate of said set of codes.

* * * * *